Dec. 25, 1956  C. O. SCHRADER  2,775,026
METHOD FOR AUTOMATIC SCREW MACHINE OPERATIONS
Filed April 26, 1954  2 Sheets-Sheet 1
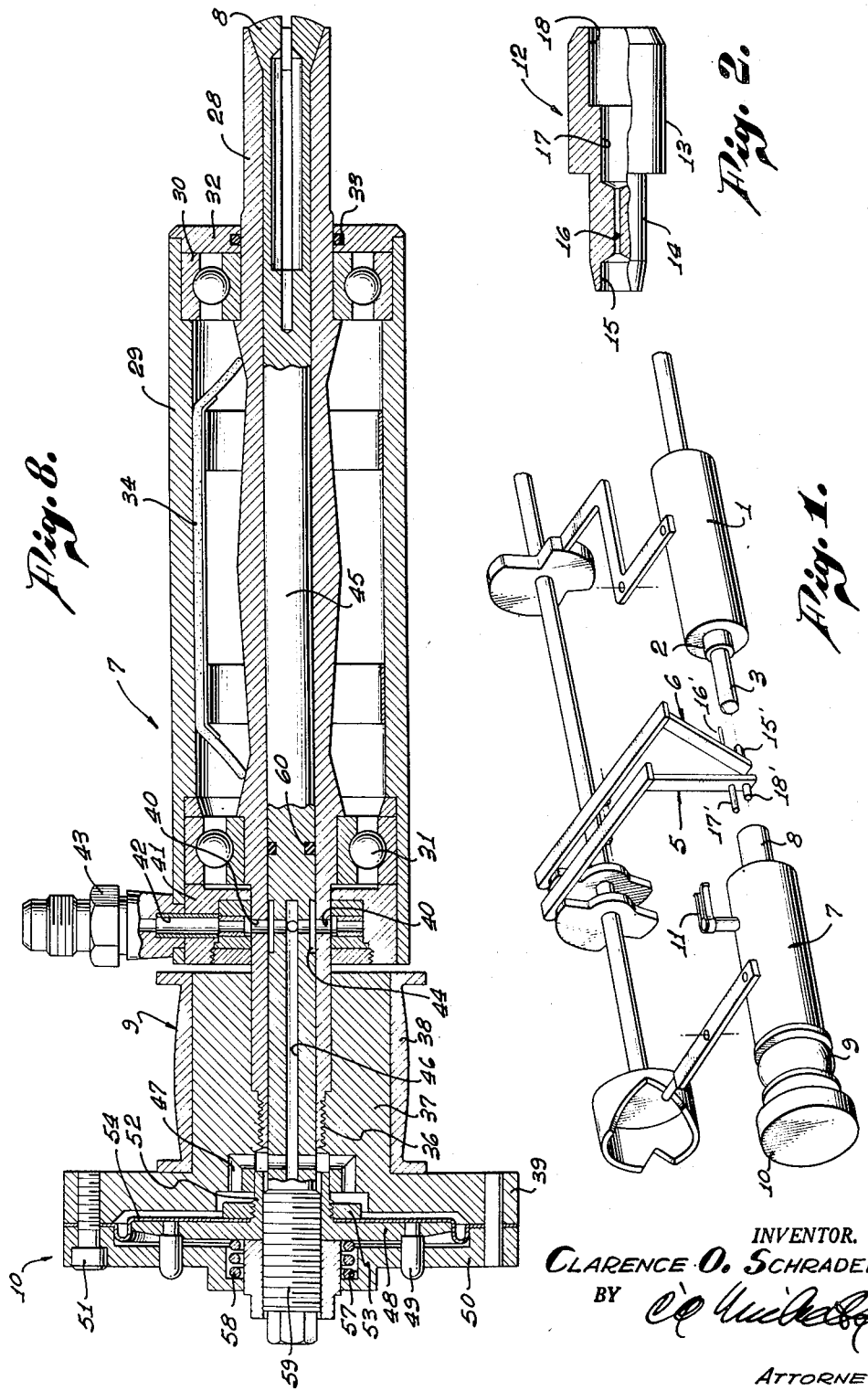
INVENTOR.
CLARENCE O. SCHRADER
BY
ATTORNEY Dec. 25, 1956  C. O. SCHRADER  2,775,026
METHOD FOR AUTOMATIC SCREW MACHINE OPERATIONS
Filed April 26, 1954  2 Sheets-Sheet 2

INVENTOR.
CLARENCE O. SCHRADER
BY
ATTORNEY.

United States Patent Office 2,775,026
Patented Dec. 25, 1956

2,775,026
METHOD FOR AUTOMATIC SCREW MACHINE OPERATIONS

Clarence O. Schrader, Lake Tahoe, Calif., assignor of one-half to Paper Mate Manufacturing Company, Culver City, Calif., a corporation of Delaware Application April 26, 1954, Serial No. 425,570

6 Claims. (Cl. 29—406)

This invention relates to a method for carrying out automatic screw operations and is particularly directed to methods of making articles having oppositely directed countersunk or counterbored ends. The opposite ends of the finished article may be in communication with each other by means of a through bore or a recess.

Automatic screw machines are well known in the art and need not be described in detail. Such machines generally comprise a main spindle and head stock through which bar stock is intermittently advanced and recoiled in accordance with the operations to be performed on the bar stock such as, for example, chamfering, undercutting, turning, centering, threading, knurling, boring, shoulder undercutting, etc. Machines of this type are generally provided with a tool frame provided with tool slides having radially movable tool holders, these tools being moved into engagement with and out of engagement with the work by means of rocker arms operated by suitable timing cams. Radial motion of a tool into contact with the bar stock or toward its center is generally referred to as infeeding; the reverse motion is termed outfeeding. Bar stock is advanced intermittently axially out of the head stock in order to permit the tools to manufacture a large number of identical parts in rapid succession from a single piece of bar stock; a retraction of the bar stock is herein termed recoil. Furthermore, in order to clarify language it is to be understood that the terms "countersunk" and "counterbored" are deemed to be equivalent and refer to any configuration imparted to an end portion of the bar stock or work which resembles a counterbored or countersunk end in that bores or conical surfaces are formed in stepped relation in such end portion.

Although automatic screw machines used heretofore are adaptable to the rapid manufacture of many small, delicate, and accurate parts, they also have certain inherent limitations and heretofore it has not been possible to manufacture articles having oppositely directed countersunk ends on a single automatic screw machine as a finished product. The present invention makes it possible to produce such parts in an accurate and rapid manner by a sequence of operations and movements not utilized heretofore. In order to fully describe the invention and provide one form of means whereby the method may be carried out, the description given hereinafter shall also disclose the construction and installation of a reciprocating driven collet and spindle assembly in axial alignment with the main spindle and head stock of an automatic screw machine.

It is an object of the present invention, therefore, to disclose and provide methods whereby articles having oppositely directed counterbored ends may be made in an automatic, continuous, uninterrupted manner on automatic screw machines.

These and other objects, uses and advantages of the present invention will become apparent from the following description, reference being had to the appended drawings in which:

Fig. 1 is a diagrammatic representation in perspective of the principal elements of an automatic screw machine equipped to carry out the method of the present invention.

Fig. 2 is an enlarged view, partly in section, of an article having oppositely directed counterbored ends made in accordance with the method of the present invention.

Fig. 8 is a longitudinal section taken through a driven and reciprocating collet and spindle assembly adapted for use in the method of this invention.

Figure 3:
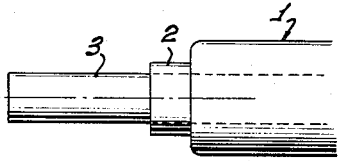
Fig. 3 is a somewhat diagrammatic representation indicating one step in the method.

Fig. 1 more or less diagrammatically illustrates the principal elements of an automatic screw machine, the head stock spindle being indicated at 1, with its collet and collet-retaining cap at 2, the housing of the spindle including suitable mechanism for opening and closing the collet and rotating the spindle at suitable speeds of, say, 5,000 R. P. M. to 20,000 R. P. M. Bar stock upon which work is to be performed is indicated at 3 and suitable mechanism, not shown, is associated with the head stock spindle for feeding the bar stock through the spindle. It is to be understood that the entire head stock is mounted for rectilinear motion so as to advance or recoil the bar stock in accordance with the various operations which are being carried out.

In front of the head stock there is a tool frame carrying a plurality of radially arranged tool holders capable of moving radially in accordance with cams driven by the machine. Two of such radial tool holders are indicated at 5 and 6. The tool holders carry selected tools particularly designed to carry out the desired operations.

In axial alignment with the head stock 1 there is shown an auxiliary reciprocating driven collet and spindle assembly 7, the external housing of this assembly being non-rotatable whereas the protruding collet 8 rotates and may be driven by a pulley 9. Collet opening and closing is accomplished by a pressure fluid control head 10. This entire spindle and collet assembly is mounted for reciprocation toward and away from the head stock 1, such reciprocation being imparted to the device by any suitable means or by means substantially identical to those in reciprocating the head stock, and in timed relation to the operations to be performed. In Fig. 1 controlled means for reciprocation and movement of the main spindle or head stock, the spindle-collet assembly or auxiliary spindle, and tool holders, may comprise a cam shaft provided with appropriately cut timing and movement imparting cams and actuating levers controlled by the cams, spring return being ordinarily used. Attention may be called to the fact that in the form illustrated, the housing of the spindle-collet assembly is shown provided with a stripping device 11, the function of such device becoming apparent from subsequent description. The collet 8 may be rotated at the same or preferably higher speed than the bar stock is rotated by head stock 1.

As previously indicated, the method of the present invention is particularly directed to methods whereby articles having oppositely directed, countersunk or counterbored ends may be manufactured. One such typical article is illustrated in Fig. 2. Such article generally identified by the numeral 12 is shown provided with an enlarged external cylindrical surface 13, a forward end portion 14 of reduced diameter being provided with an outwardly tapering end or nose, such nose being then provided with a counterbore 15 of relatively large diameter communicating with a small diameter bore 16 leading into bore 17 in communication with a larger bore 18 at the opposite end of the article.

Heretofore it has not been possible to manufacture an article such as 12 on an automatic screw machine in a single, continuous operation. Instead, the external surfaces 13 and 14, as well as bores 15 and 16, could be made but then it was necessary to cut off the article from the bar stock and in a subsequent operation on a different machine reverse the article, hold it by the reduced portion 14 and make the bores 17 and 18. Since many articles of this character are very small and must be made with extreme precision, it has been difficult, even impossible, to make certain that the subsequently bored or countersunk portions 17 and 18 were in true axial alignment with bores 15 and 16. In addition, the previous methods involved the use of two machines and consumed a great deal of time. These disadvantages are obviated by the method of the present invention and permit articles such as 12 to be made upon a single machine by a continuous sequence of operations.

Figure 4:
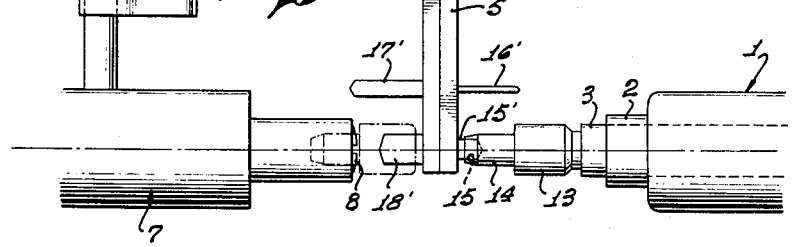
Fig. 4 is another diagrammatic representation illustrating a further step in the method.
Figure 5:
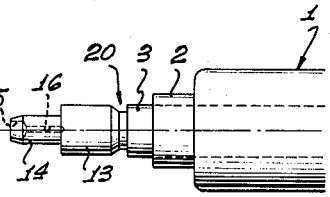
Figs. 5, 6 and 7 are representations illustrating further steps in the sequence of operations.

Three primary steps in the method of this invention are illustrated in Figs. 3, 4, and 5. In Fig. 3 the end of bar stock 3 is shown extending from collet 2 of the head stock 1. In Fig. 4 external surfaces 13 and 14 have been turned by suitable tools (not shown) and recess 15 is being formed by drill 15' of radially movable tool element 5. In Fig. 5 bore 16 has been drilled by drilling tool 16' (after suitable retraction and advance of the bar stock) and tool holder 5 is in raised or outfeed position.

The bar stock 3 is then advanced by the head stock 1 and another radial tool holder provided with a cutoff tool cuts off the partially worked article 12 at zone 20. Simultaneously therewith the auxiliary spindle and collet assembly 7 (which is in axial alignment with the bar stock 3) advances from the full-line position indicated in Fig. 6 to the dash-line position and the collet 8 grasps the partly worked portion of the bar stock by engaging external surface 14 as soon as the partly worked end of the bar stock is cut off at zone 20. The auxiliary spindle-collet assembly 7 then recoils or retracts into full-line position (shown in Figs. 6 and 7). The forward end of the bar stock is then again advanced into the position indicated in full lines in Fig. 7 and suitable tools are infed to work on such remaining forward end of the bar stock and again produce the external surfaces 13 and 14 of a succeeding article. Tool holder 5 is also infed and it will be noted that such tool holder carries boring tools directed toward the head stock 1 (as indicated at 15' and 16') and carries additional boring tools as indicated at 18' and 17', the latter being directed in the opposite direction away from the head stock and toward the spindle-collet assembly 7. When the bar stock 3 is advanced by the head stock so as to permit boring tool 15' to form recess 15, the spindle-collet assembly 7 simultaneously moves the partly advanced article 12 (from the position shown in Fig. 7) toward the boring tool 18' so as to permit such tool to form bore 18, as illustrated in Fig. 4. The bar stock 3, as well as the partly worked article 12, is then retracted or recoiled and tool holder 5 moves boring tools 16' and 17' into position, whereupon the bar stock and the partly worked piece are again brought into operative engagement with such boring tools, thereby forming bore 16 in the forward end of the bar stock and forming the bore 17 in the opposite end of the partly worked article 12 held by the collet 8 of assembly 7.

It will be noted that the forward end of the bar stock 3 is therefore counterbored while at the same time the rear end of a previously partly worked piece is being counterbored on the same machine.

Figure 6:
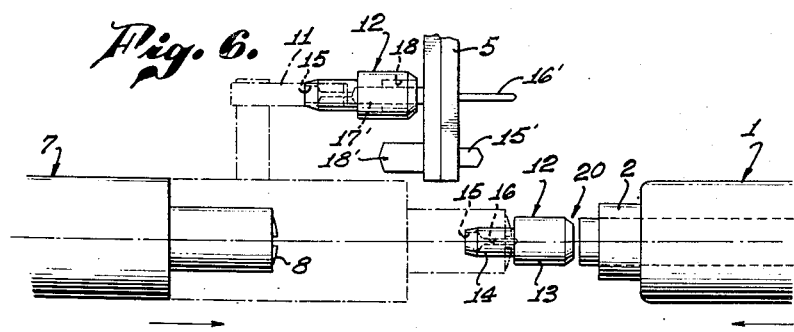
Figure 7:
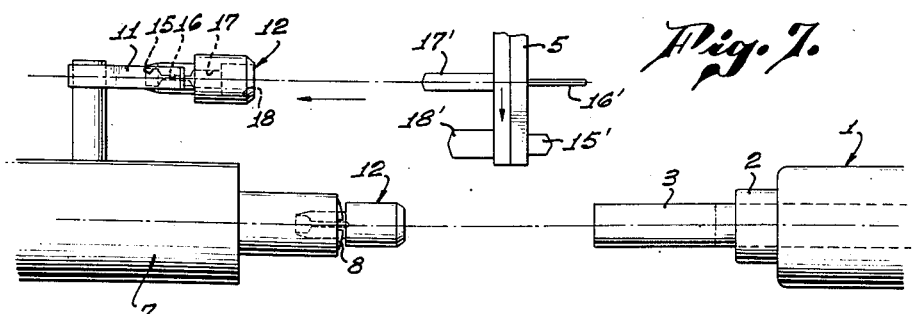

After such counterboring has been completed, the assembly 7 is retracted, but the collet 8 releases its hold on article 12 before such retraction, permitting the article 12 to remain upon boring tool 17'. As tool holder 5 is outfed, it moves said article 12 laterally, as illustrated in Fig. 6. When assembly 7 is advanced so as to permit collet 8 to grasp the partly worked, forward end of bar stock 3, the stripper device 11 grasps the finished article 12 and removes such article 12 from the boring tool 17' on the recoil of assembly 7. In other words, the movement of partly worked piece from the forward end of bar stock 3 axially into position for counterboring on the rear end of such work piece (into position illustrated in Fig. 7) is accompanied by the stripping of a finished piece from boring tool 17'. The stripping tool 11 preferably comprises a pair of resilient fingers capable of grasping the object or article 12 and removing it from the boring tool 17', the article 12 being then knocked out from between the stripping fingers 11 by a suitable stop, permitting the article to fall into a chute leading to a collection basket or tray.

The description here given relates to a single tool holder 5 bearing boring tools 15', 16', 17' and 18', but in many cases it is desirable to use two tool holders, one bearing boring tools 15' and 16' and another bearing 17' and 18' these two holders moving in separate planes to perform the operations here described. It is sometimes easier to change, replace and adjust the boring tools when two tool holders are used.

Generally stated, therefore, the method comprises moving bar stock axially in a forward direction and moving a previously cutoff, partly worked article axially in the opposite direction but in alignment with said bar stock, infeeding bore tools into the path of travel of said bar stock and partly worked article to counterbore the forward end of the bar stock and simultaneously counterbore the reverse end of the previously cutoff, partly worked article and then recoiling the bar stock and outfeeding the boring tools, the boring tools laterally moving the countersunk, previously cut part therewith. It is to be understood that the partly worked forward end of the bar stock may be turned, knurled, chamfered or otherwise worked.

The spindle and collet assembly generally indicated at 7 heretofore is shown in greater detail in Fig. 8. The collet 8 is carried by a spindle 28 mounted for rotation within the housing 29 upon suitable bearings 30 and 31. The housing 29 may also be provided with an end cover 32 retaining a suitable packing or O-ring 33. The space between the housing 29 and the spindle 28 may be provided with suitable lubrication by means of a wick 34. The rear portion of the spindle 28 is in threaded engagement as indicated at 36 with element 37 carrying the driving pulley 38, the element 37 also including a flange 39 forming a part of the housing of the collet-actuating mechanism 10. The spindle 28 is also provided with one or more radial ports such as 40, in alignment with a supply of controlled pressure fluid, such as air or hydraulic fluid. As illustrated, the housing 29 may be provided with an end plug 41 provided with a radially extending supply bore 42 in communication with a coupling member 43 which may be connected to a source of fluid pressure by a flexible cable. Air admitted through the coupling 43 can therefore pass through bore 42 and port 40 into an annular groove 44 formed in the collet-operating rod 45. The annular groove 44 is provided with two or more rearwardly directed surface grooves or channels 46 adapted to carry the air to radially and rearwardly extending passageways 47 formed in member 37.

The flange 39 of element 37 is recessed and is adapted to movably receive a backing plate 48 provided with rearwardly extending pins 49, said pins being slidably mounted in a rear cover plate 50 attached to the flange 39 as by means of studs 51. The backing plate 48 also includes a forwardly directed annular boss 52 adapted to threadedly receive a locking ring 53 which holds the inner annular edge portion of a flexible diaphragm 54, the outer edge portions of such flexible diaphragm being clamped between the pins 49 and the cover plate 50. The cover plate 50 also includes a recess 57 carrying a spring 58 which bears against the backing plate 48 and normally urges such backing plate forwardly. The backing plate 48 is threadedly attached to an enlarged, externally threaded rear end portion 59 of the collet-operating rod 45 so that normally the collet 8 is in open position. When, however, air is admitted through the coupling 43, passageway 42, port 40, annular groove, longitudinal channel 46 and passageways 47 to act upon the front face of diaphragm 54, the rearward motion of such diaphragm is transmitted by backing plate 48 to the collet-operating rod 45 so as to close the collet.

It will be noted that the entire collet-operating mechanism preferably rotates at higher speed than the spindle and the collet is opened and closed during rotation. Moreover, the collet-operating mechanism is totally independent of means employed in advancing or retracting the entire assembly 7.

Attention is called to the fact that in order to prevent air or pressure fluid from moving forwardly into the collet 8, the collet-operating rod 45 is provided with suitable O rings or other gasketing 60 at a zone in advance of the annular air distribution groove 44.

I claim:

1. A method of making articles having oppositely directed countersunk ends from bar stock on a single automatic screw machine comprising: moving bar stock axially in one direction; moving a previously cutoff, partly worked part axially in the opposite direction but in alignment with said bar stock; infeeding boring tools into the path of travel of said bar stock and partly worked part to counterbore the forward end of the bar stock and simultaneously counterbore the reverse end of the previously cutoff partly worked part; recoiling the bar stock and outfeeding the boring tools, said boring tools laterally moving the countersunk previously cut part therewith.

2. A method of making articles having oppositely directed countersunk ends from bar stock on a single automatic screw machine by a sequence of automatic operations comprising: countersinking the forward end portion of bar stock; cutting off a partly worked part from the countersunk, forward end of said bar stock; maintaining the cutoff partly worked part in axial alignment with the bar stock but spaced therefrom and simultaneously countersinking the forward end of the remaining bar stock and countersinking the reverse end of the previously cutoff partly worked part.

3. A method as stated in claim 2, wherein the previously cutoff partly worked part is moved axially toward the bar stock during countersinking of the reverse end of such cutoff part.

4. A method as stated in claim 2 wherein the previously cutoff part is moved laterally after the reverse end of such part has been countersunk.

5. A method of making articles having oppositely directed countersunk ends from bar stock on a single automatic screw machine having a main spindle and head stock and radially movable tool holders, comprising: axially advancing and rotating bar stock; infeeding turning and boring tools to work on the exterior and forward end of the bar stock to form a countersink in such forward end portion; outfeeding boring tools; cutting off the partially worked end portion of the bar stock, grasping and axially moving the cutoff partially worked portion in a forward direction while continuing to rotate the said portion; infeeding turning and boring tools to work on the exterior and forward portion of remaining bar stock and simultaneously axially advancing the cutoff partially worked portion in a reverse direction to countersink the reverse end of said cutoff partially worked portion; releasing the cutoff portion and outfeeding the boring tools.

6. A method of the character stated in claim 5 wherein the partially worked cutoff portion is moved laterally upon a boring tool after the reverse end of said portion has been countersunk.

References Cited in the file of this patent

UNITED STATES PATENTS

| 1,444,172 | Downie | Feb. 6, 1923 |
| 1,622,678 | Schramm | Mar. 29, 1927 |
| 1,625,116 | Fish | Apr. 19, 1927 |
| 1,837,312 | Arms | Dec. 22, 1931 |
| 1,865,567 | Horste | July 5, 1932 |